Dec. 17, 1957  M. J. SCHLATTER  2,816,940
SEPARATION OF ALKYL BENZENES BY SELECTIVE ALKYLATION
WITH A TERTIARY ALKYLATING AGENT
Filed Sept. 23, 1950
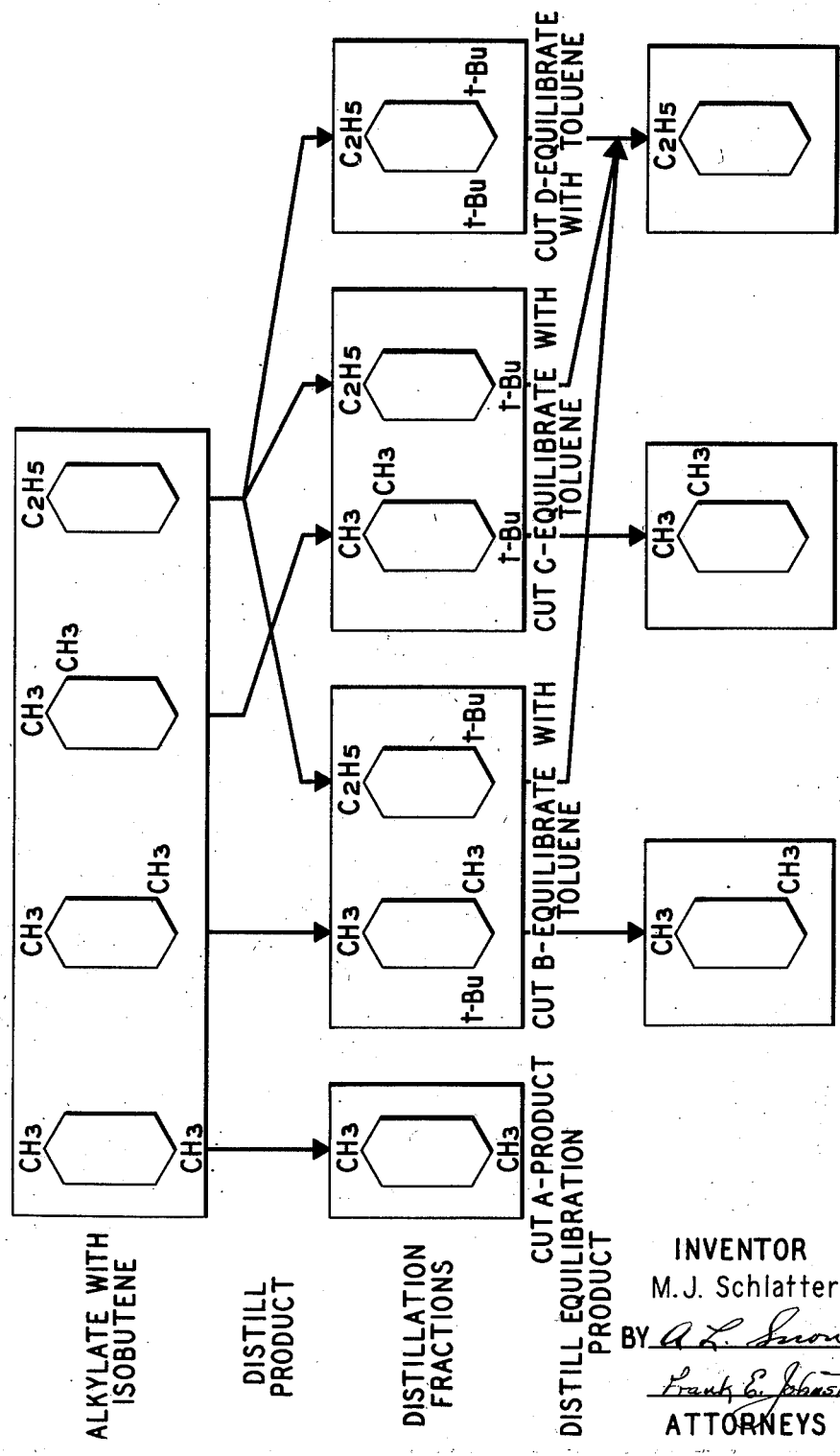
INVENTOR
M.J. Schlatter
BY
ATTORNEYS United States Patent Office 2,816,940
Patented Dec. 17, 1957

2,816,940

SEPARATION OF ALKYL BENZENES BY SELECTIVE ALKYLATION WITH A TERTIARY ALKYLATING AGENT

Maurice J. Schlatter, El Cerrito, Calif., assignor to California Research Corporation, San Francisco, Calif., a corporation of Delaware Application September 23, 1950, Serial No. 186,425

15 Claims. (Cl. 260—674)

This invention relates to the separation of hydrocarbon mixtures which cannot be satisfactorily separated by conventional methods such as fractional distillation. More particularly, the invention relates to the separation of certain polyalkylbenzenes from hydrocarbon mixtures by a process involving selective alkylation of certain of the compounds constituting the mixture, separation of the components of the resulting mixture, and dealkylation of the alkylated compounds to regenerate the original constituents of the mixture.

The separation of mixtures of isomeric polyalkylbenzenes such as the xylenes, cymenes, diethylbenzenes and trimethylbenzenes cannot be readily effected by distillation methods. Various processes have been devised involving combinations of simple and azeotropic distillation and fractional crystallization which make possible the separation of a part of a particular isomer contained in a mixture of isomeric polyalkylbenzenes as derived from the usual commercial sources. A considerable incentive exists and has existed for a rather long time to make relatively complete separations of pure isomers from such mixtures. Commercial uses have been developed in which a single polyalkylbenzene isomer substantially free of the other isomers is required as a charging stock.

It is an object of this invention to provide a method by which substantially complete separation of one or more of the polyalkylbenzene isomers contained in a mixture comprising polyalkylbenzene isomers may be effected.

It has been found that polyalkylbenzenes having at least three adjacent unsubstituted positions on the benzene ring may be separated from a hydrocarbon mixture containing them by contacting the hydrocarbon mixture with a tertiary alkylating agent, i. e., an alkylating agent containing a tertiary carbon atom having no hydrogen atom bonded to it, in the presence of an alkylation catalyst under alkylating conditions whereby the polyalkylbenzenes having at least three adjacent unsubstituted positions on the benzene ring are selectively alkylated, fractionally distilling the reaction product to separate the alkylated hydrocarbons from the unalkylated hydrocarbons, and subjecting the alkylated hydrocarbons to a dealkylation treatment to liberate the polyalkylbenzene having at least three adjacent unsubstituted positions on the benzene nucleus.

More specifically, it has been found that a mixture of isomeric polyakylbenzenes containing substantial amounts of at least one isomer characterized by the presence of at least three adjacent unsubstituted positions on the benzene nucleus and substantial amounts of at least one isomer characterized by the presence of not more than two adjacent unsubstituted positions on the benzene nucleus may be separated by contacting the mixture with a tertiary alkylating agent such as a tertiary olefin, a tertiary alcohol, a tertiary alkyl chloride or a cycloalkyl hydrocarbon containing a tertiary carbon atom in the ring, in the presence of an alkylation catalyst under alkylating conditions and fractionally distilling the reaction product to separate the unalkylated isomers from the alkylated isomers. It has been found that polyalkylbenzenes having at least three adjacent unsubstituted positions on the benzene nucleus may be readily alkylated with the aforementioned alkylating agents while isomers of these polyalkylbenzenes having not more than two adjacent unsubstituted positions on the benzene nucleus are markedly resistant to alkylation by these alkylating agents. Accordingly, in the preferred embodiment of the invention, the alkylating agent is supplied to the alkylation reaction in quantity sufficient to react with those isomers having at least three adjacent unsubstituted positions on the benzene nucleus. These isomers are selectively alkylated by the alkylating agent and form higher boiling tertiary alkyl substituted compounds. The reaction mixture is then fractionally distilled to separate the isomers having not more than two adjacent unsubstituted positions on the benzene nucleus as an unalkylated overhead fraction. The tertiary alkyl groups may be removed from the alkylated isomers constituting the kettle product either before or after fractionation of the kettle product to separate individual isomers contained in it as desired.

Other methods may be employed to separate the alkylated isomers from the unalkylated isomers such as selective adsorption, solvent extraction, fractional crystallization, azeotropic distillation, and the like.

Of the numerous tertiary alkylating agents of the character described, it is preferred to employ those which introduce a tertiary-butyl group into the material undergoing alkylation, i. e., isobutene, tertiary-butylalcohol, tertiary-butylchloride, teritary-butylmercaptan, and diisobutylene.

The selectivity of the alkylation of polyalkylbenzene isomers with an alkylating agent capable of introducing a tertiary alkyl group into the benzene nucleus is illustrated by the data summarized in the following Table I. This table summarizes experiments in which each of the xylene isomers was individually contacted with isobutene in the presence of hydrogen fluoride as a catalyst under alkylating conditions.

TABLE I

| Isomer used | Orthoxylene 98.9% | | Metaxylene 94.9% | | Paraxylene 96.3% | |
| --- | --- | --- | --- | --- | --- | --- |
| Purity (f. p. method) | | | | | | |
| | *g.* | *mols* | *g.* | *mols* | *g.* | *mols* |
| Charge: | | | | | | |
| Xylene | 1000 | 9.4 | 961 | 9.0 | 477 | 4.5 |
| Isobutene (99 mol percent) | 441 | 7.9 | 448 | 8.0 | 224 | 4.0 |
| Hydrogen fluoride | 139 | 6.9 | 150 | 7.5 | 146 | 7.3 |
| Reaction conditions: | | | | | | |
| Temperature (° C.) | 0–10 | | 0–5 | | 0–3. | |
| Time of addition of reactants to catalyst (hrs.) | 2.4 | | 4.2 | | 2.9. | |
| Total time of reaction (hrs.) | 4.4 | | 6.2 | | 4.9. | |
| Product composition (wt. percent): | | | | | | |
| Xylene (recovered) | 21 | | 17 | | 51. | |
| Mono-tert-butylxylene | 72 | | 76 | | (11)[1]. | |
| Higher-boiling products | 7 | | 7 | | 33.[2] | |
| Properties of the mono-tert-butyl-benzenes: | | | | | | |
| Structure | 1,2-dimethyl-4-tert-butyl-benzene. | | 1,3-dimethyl-5-tert-butyl-benzene. | | 1,4-dimethyl-2-tert-butyl-benzene. | |
| Boiling point: | | | | | | |
| (760 mm.), ° C | 215 | | 207 | | 224. | |
| (100 mm.), ° C | | | | | 150.2. | |
| Refractive index, $n_D^{20}$ | 1.4992 | | 1.4964 | | 1.4979. | |
| Density, $d_4^{20}$ | 0.8733 | | 0.8654 | | 0.8730. | |
| Melting point, ° C | −25.6 | | −17.7 | | | |

[1] This is the proportion of product boiling from 140–237° C. A small amount of pure 1,4-dimethyl-2-tert-butylbenzene was isolated from this by silica gel absorption to separate from olefins and paraffins present, followed by fractional distillation.

[2] This fraction was found by spectrometric analysis to contain a substantial proportion of aromatic hydrocarbons.

From the data in the above table, it is seen that orthoxylene and metaxylene, both of which have three adjacent unsubstituted positions on the benzene ring, are readily alkylated with isobutene to produce monotertiary-butyl xylenes. The isobutene employed in the experiments was insufficient to alkylate all of the xylene present, but it will be noted that the yields of monotertiary-butyl xylenes based on isobutene are very high.

It will be noted that in the case of paraxylene, which has only two adjacent unsubstituted positions on the benzene ring, a very small yield of monotertiary-butyl xylene was obtained. As reported in the table, 11% of the reaction product boiled in the range 140 to 237° C. This fraction is for the most part of undetermined composition, but contained only a very small amount of 1,4-dimethyl-2-tertiary-butylbenzene. It will be noted further in connection with the reaction of the paraxylene that a considerable quantity of higher boiling products were formed. While paraxylene gives only a small amount of the simple alkylation product in which a tertiary-butyl group is introduced into the benzene ring, an appreciable quantity of paraxylene is consumed if the paraxylene is maintained in contact with isobutene and an alkylation catalyst for a fairly long period of time, as was the case in the reported experiment. Accordingly, when the separation of a xylene mixture by selective alkylation of ortho- and metaxylenes with isobutene is undertaken, the amount of isobutene charged to the reactor in a batch process, or permitted to be consumed in the reaction in a continuous process, is limited to that which is required to react with the ortho- and metaxylenes present in the feed. In the event that the feed is a xylene-rich fraction separated from catalytically reformed naphtha, appreciable quantities of ethylbenzene are usually present and a sufficient quantity of isobutene is employed to alkylate the ethylbenzene in addition to the ortho- and metaxylenes. Indeed, it may even be found desirable from the standpoint of overall yield of desired product to use less tertiary-butylating agent than is required to react with all of the ortho- and metaxylene and ethylbenzene. The unalkylated hydrocarbons from fractional distillation of the reaction product thus obtained is enriched in paraxylene and is a superior feed stock for a low-temperature crystallization process which yields paraxylene of high purity.

In other separations, as for example the isolation of pure paradiethylbenzene from a diethylbenzene mixture substantially free of other compounds, it may be desirable to use more tertiary-butylating agent than is required to react with the ortho- and metaisomers present in order to reduce the concentration of these isomers to the minimum in the unalkylated product.

A xylene fraction separated from catalytically reformed naphtha was subjected to alkylation under conditions similar to those shown in Table I above. The amount of isobutene introduced into the reactor was appreciably less than the amount required to alkylate all of the aromatic hydrocarbons present in the xylene fraction. The xylene mixture before alkylation contained 14% ethylbenzene, 8% orthoxylene, 48% metaxylene, 18% paraxylene, and 12% of paraffins boiling in the boiling range of the xylenes. After the alkylation reaction, the following percentages of the compounds present in the feed remained unchanged in the $C_8$ cut distilled from the reaction product: 6% of the ethylbenzene, 12% of the orthoxylene, 16% of the metaxylene, 94% of the paraxylene, and 76% of the paraffins. At this stage in the reaction relatively little of the ethylbenzene, the orthoxylene, and the metaxylene remained unalkylated, while very little of the paraxylene had been consumed in the reaction. Where it is desired to recover only paraxylene from such a charging stock, the reaction product of the alkylation step need only be fractionally distilled to recover an overhead fraction consisting largely of paraxylene and paraffins. Substantially pure paraxylene may then be recovered from this overhead by crystallization. It may be desired, however, to separately recover orthoxylene, metaxylene, and ethylbenzene in addition to the paraxylene. The manner in which these products may be recovered is illustrated in the appended drawing, which is a flow sheet showing the process steps employed. The $C_8$ aromatic hydrocarbons are alkylated with a tertiary alkylating agent in the first step of the process. This step is conducted employing any conventional alkylation catalyst under conventional alkylating conditions. The alkylating agent is ordinarily isobutene, but tertiary-butyl alcohol or tertiary-butyl chloride, each of which introduces a tertiary-butyl group into the material to be alkylated, may be employed. Following the alkylation step, the hydrocarbons are separated from the catalyst and fractionally distilled to separate the four cuts shown in the drawing.

Cut A, the first overhead cut, consists principally of paraxylene which boils at 138° C. When the $C_8$ aromatics charged to the alkylation step contain paraffins, the paraxylene cut will be contaminated by some paraffins which distill with the paraxylenes.

Cut B contains 1,3-dimethyl-5-tertiary-butylbenzene and metatertiary-butylethylbenzene. These materials boil at 206° C. and 205° C., respectively, and are recovered together in a narrow-boiling fraction. Only about 15% of the ethylbenzene present in the charge stock is converted to the meta isomer in the hydrogen fluoride catalyzed alkylation, the remainder is converted to paratertiary-butylethylbenzene.

Cut C contains 1,2-dimethyl-5-tertiary-butylbenzene and paratertiary-butylethylbenzene. These materials boil at 215° C. and 211° C., respectively.

Cut D consists predominantly of 3,5-ditertiary-butylethylbenzene which boils at 260° C.

In one modification of the process of the invention, cuts B, C and D are separately contacted with an acceptor for the tertiary-butyl group in the presence of an alkylation catalyst under mild alkylating conditions. Suitable acceptors are benzene, toluene, phenol, or other aromatic compounds with three adjacent, unsubstituted, nuclear positions. Under these conditions, transfer of the tertiary-butyl group to the acceptor gives the tertiary-butyl substituted derivative of the acceptor. For example, if toluene is employed as the acceptor, tertiary-butyltoluenes are formed. The reaction product obtained from the treatment of each of the distillation cuts in this manner is then fractionally distilled. From the reaction product of cut B, metaxylene, ethylbenzene and tertiary-butyltoluene are separately recovered. From the reaction product of cut C, orthoxylene, ethylbenzene and meta- and paratertiary-butyltoluenes are recovered. From the reaction product of cut D, ethylbenzene and tertiary-butyltoluenes are recovered.

The tertiary-butyl groups which have been transferred to toluene may be recycled by equilibrating the crude xylene mixture with meta- and/or paratertiary-butyltoluene in the presence of an alkylation catalyst. The catalyst is then removed and toluene distilled off. If a higher degree of tertiary-butylation of the mixture is desired, catalyst can be added and isobutene or any other suitable tertiary-butylating agent added. Any tertiary-butyltoluene remaining in the mixture need not be separated at this point.

Another alternative consists in driving the transfer of the tertiary-butyl group from tertiary-butylbenzene or tertiary-butyltoluene to completion by distilling off the benzene or toluene as it is formed. This may be best accomplished with the more active catalysts by operating under reduced pressure to keep the reaction temperature low and thus minimize undesirable side reactions.

If desired, cut B may be subjected to the following alternative treatment. This cut may be subjected to further alkylation to convert the metatertiary-butylethylbenzene to 3,5-ditertiary-butylethylbenzene which may then be separated from the 1,3-dimethyl-5-tertiary-butylbenzene by fractional distillation and included in cut D for further treatment.

The separation of $C_8$ aromatic hydrocarbons by the process of the invention is further illustrated by the following example employing another catalyst. This experiment shows that a mixture of paraxylene and paraffins can be separated from other $C_8$ aromatic hydrocarbons by essentially complete tertiary-butylation of the latter and distillation of the reaction product. Most of the orthoxylene and metaxylene are obtained as monotertiary-butylated products. The ethylbenzene is obtained mainly as mono- and ditertiary-butylethylbenzene. The original hydrocarbons can be regenerated by transfer of the tertiary-butyl group to a suitable acceptor.

The hydrocarbon mixture used in this study had the following composition:

| | Vol. percent | Approximate composition of 300 g. charge | |
|---|---|---|---|
| | | G. | Mols |
| Ethylbenzene | 10.5 | 31.5 | 0.296 |
| Orthoxylene | 10.7 | 32.1 | 0.302 |
| Metaxylene | 57.2 | 171.6 | 1.614 |
| Paraxylene | 18.3 | 54.9 | 0.516 |
| Paraffins | 3.3 | 9.9 | |

The hydrocarbon charge (300 g.) was cooled to 0° C. in a one-liter "turbo-reactor" immersed in an ice bath and equipped with a "tru-bore" stirrer seal, a means of adding tertiary-butyl chloride at the bottom of the reactor and a reflux condenser connected to a gas absorption device. Anhydrous ferric chloride (15.0 g., 0.092 mols) was added and 348 g. (3.76 mols) of tertiary-butyl chloride run in over a period of one hour, while keeping the temperature below 2° C. Stirring was continued at 0° C. for another 1.5 hours, and the bath removed. The temperature rose to 23° C. in 0.5 hour and stirring was continued at this temperature for one hour. The mixture was allowed to stand overnight. The weight at this point was 569.3 g., corresponding to a loss of hydrogen chloride and other volatiles of 93.7 g. The mixture was diluted with 100 ml. of ether, shaken with 150 ml. of 3 N. hydrochloric acid and 2-100 ml. portions of water and dried over anhydrous potassium carbonate. Distillation of the product through a 90 cm. x 14 mm. column packed with glass helices gave the following fractions:

| Fraction | Composition | Weight, g. |
|---|---|---|
| A | Tertiary-butyl chloride | 50.9 |
| B | Xylene fraction | 59.5 |
| C | Monotertiary-butyl xylenes and monotertiary-butylethylbenzenes | 289.0 |
| D | Ditertiary-butyl derivatives | 16.5 |
| E | B. P. 160–220° C. at 20 mm | 30.8 |
| F | Bottoms (above 220° C. at 20 mm.) | 13.5 |
| | | 460.2 |

The discrepancy between weight of reactor contents at the end of the run and weight of distilled product is believed to be due largely to loss of volatile tertiary-butyl chloride.

*Fraction B.*—Ultra-violet spectrometric analysis of the xylene cuts boiling from 135–145° C. (95% of Fraction B) gave the following results:

| | Product (vol. percent) | Feed (vol. percent) |
|---|---|---|
| Ethylbenzene | 0 | 10.5 |
| Orthoxylene | 0 | 10.7 |
| Metaxylene | 3.2 | 57.2 |
| Paraxylene | 82.1 | 18.3 |
| Paraffins | 14.7 | 3.3 |
| p-Xylene/paraffin ratio | (5.6) | (5.5) |

*Fraction C.*—Boiling range: 172–228° C. at 760 mm. (98% of this fraction distilled from 205 to 212° C.)

*Fraction D.*—Boiling range: 155–198° C. at 100 mm. (95% of this fraction distilled from 163–176° C. at 100 mm.–235–249° C. at 760 mm.)

This fraction contained 1,4-ditertiary-butylbenzene which crystallized from the distillation cut. B. P. 163–171° C. at 100 mm. (8.0 g.). The solid hydrocarbon (4.3 g.) was separated by centrifugation and on one recrystallization from methanol melted at 77.5–78.0° C. The melting point was not depressed when a portion of this solid was mixed with an authentic sample of 1,4-ditertiary-butylbenzene.

*Fraction E.*—Boiling range: 160–220° C. at 20 mm. (50% of this fraction distilled from 204–207° C. at 20 mm.) The very high refractive indices of the distillation cuts comprising this fraction indicate the presence of bicyclic compounds, perhaps naphthalenes, or highly substituted benzenes:

B. P. 138.5–187.5° C. at 20 mm. 5.7 g. $n_D^{20}$ 1.5163
B. P. 187.5–205.6° C. at 20 mm. 15.3 g. $n_D^{20}$ 1.5469
B. P. 146–175° C. at 1 mm. 14.4 g. $n_D^{20}$ 1.5460

As indicated above, the hydrocarbon mixtures which may be separated by the process of the invention may be generally described as mixtures containing substantial quantities of at least one aromatic hydrocarbon having at least three adjacent unsubstituted positions on the benzene ring. Thus, orthoxylene has been separated from paraxylene by the selective alkylation of the orthoxylene; metaxylene has been separated from paraxylene by selective alkylation of the metaxylene; ortho- and metaxylene have been separated from paraxylene by selective alkylation of both the ortho- and metaxylenes. Hemimellitene has been separated from pseudocumene or mesitylene, or both, by selective alkylation of the hemimellitene. Other mixtures of the lower polyalkylbenzenes comprising polyalkylbenzenes having at least three adjacent unsubstituted positions on the benzene ring and polyalkylbenzenes having fewer than three adjacent unsubstituted positions on the ring are readily separated by the process of the invention, for example, mixtures of any of the following compounds or the isomers of one or more of the compounds may be separated, polyethylbenzenes, polypropylbenzenes, methylethylbenzenes, methylpropylbenzenes, ethylpropylbenzenes, dimethylethylbenzenes, methyldiethylbenzenes, and the like. Further, polyalkylbenzenes in which the individual alkyl groups contain 1 to 15 carbon atoms are responsive to this method of separation. For example, alkyl toluenes prepared by alkylating toluene with $C_{12}$–$C_{15}$ olefins in the course of detergent manufacture may be separated by alkylating the alkyl toluenes with a tertiary olefin such as isobutene. The orthoalkyltoluene is selectively alkylated and the more desirable para-alkyltoluene is separated from the alkylation reaction product by fractional distillation.

Highly aromatic cuts separated from catalytically reformed naphtha are especially adaptable to separation by the process of the invention. For example, the distillation fraction boiling in the range about 270 to 300° F. obtained from hydroformed naphtha ordinarily has an aromatic content in the range 50 to 60% and these aromatics consist predominantly of xylenes. Paraxylene may be separated from this distillation fraction by the process of the invention. This distillation fraction may be subjected to a second-pass catalytic reforming treatment by which the aromatic content is substantially increased. A distillation cut boiling in the range 275 to 300° F. may be separated from the second-pass product and will ordinarily have an aromatic content of about 90%. This latter distillation cut will ordinarily contain from about 12 to 20% orthoxylene, 45 to 55% metaxylene, 15 to 20% paraxylene, 6 to 12% ethylbenzene, and 8 to 14% of paraffins. Paraxylene is readily separated from this distillation cut by the process of the invention. The 300 to 350° F. cut separated from catalytically reformed naphtha predominates in trimethylbenzene. The 1,2,3-trimethylbenzene contained in the cut may be selectively butylated and the 1,2,3-trimethyl-5-tertiary-butylbenzene thus formed separated from the 1,2,4- and 1,3,5-trimethylbenzenes by fractional distillation.

The separation of hemimellitene from a catalytically reformed naphtha fraction by the process of the invention is illustrated by the following example.

A crude hemimellitene fraction was isolated by fractional distillation from a "hydroformed" petroleum naphtha fraction. It was shown by infrared spectrometric analysis to contain approximately 80–85% hemimellitene, 8% pseudocumene, 7% indane and no mesitylene or 1-methyl-2-ethylbenzene.

A mixture of 856 g. of this crude hemimellitene (containing approximately 5.7–6.0 mols of hemimellitene) and 383 g. (6.82 mols) of isobutene was prepared at 0° C. This mixture was added over a period of 30 minutes to 331 g. (16.6 mols) of liquid hydrogen fluoride which was vigorously stirred in a 5-liter copper-flask equipped with stainless-steel stirrer, gas-outlet tube and dropping-funnel and cooled in an ice-bath. Stirring and cooling were continued for 2 hours after addition of the reactants was complete. The reaction mixture was poured on crushed-ice and the acid neutralized with 1000 g. (17.9 mols) of potassium hydroxide. The light-yellow organic phase and 3–300 ml. ether extracts of the aqueous phase were combined, washed with water, dried over potassium carbonate and volatiles removed on a steam plate. Distillation through a 75 cm. x 25 mm. column packed with ³⁄₃₂" Pyrex glass helices gave the following fractions:

| Fraction | Weight, g. | Boiling range at 50 mm. pressure, ° C. |
| --- | --- | --- |
| A | 161.4 | 33–141 |
| B | 821.4 | 141–143 |
| C | 100.8 | Above 143 |

Redistillation of fraction A gave 137.7 g. of material boiling from 168.7–175.9° C. at 760 mm. which was shown by infrared spectrometric analysis to contain 40–45% pseudocumene and 40–45% hemimellitene. Other components were not estimated.

Fraction B solidified and gave 754 g. of 1,2,3-trimethyl-5-tertiary-butylbenzene, M. P. 31.0–31.2° C., on recrystallization from methanol. The yield was approximately 75% based on hemimellitene present in sample charged.

Hemimellitene may be recovered from Fraction B by equilibrating that fraction with an acceptor for the tertiary alkyl group. This is illustrated by the following example employing metaxylene as the acceptor.

A mixture of 176 g. (1 mol) of 1,2,3-trimethyl-5-tertiary-butylbenzene and 424 g. (4 mols) of metaxylene were added to 183.5 g. (9.18 mols) of liquid hydrogen fluoride contained in a copper flask which was immersed in an ice bath. The mixture was stirred vigorously at 0° C. for 4.5 hours, poured on crushed ice and neutralized with excess potassium hydroxide. The combined organic phase and ether extracts of the aqueous layer were washed with 5% aqueous sodium bicarbonate, dried and distilled. After removal of the metaxylene the reaction product was found to have the following composition:

Percent by weight
Hemimellitene _____ 37.6
1,3-dimethyl-5-tertiary-butylbenzene _____ 47.5
1,2,3-trimethyl-5-tertiary-butylbenzene _____ 14.3
Bottoms _____ 0.6

The hemimellitene fraction boiled constant at 176.1–176.2° C. at 760 mm. pressure, $n_D^{20}$ 1.5135, and the entire plateau cut boiling from 174–181° C. was found spectrometrically to contain less than 1% of 1,2,4- and 1,3,5-trisubstituted benzenes.

The alkylation step of the process of the invention is effected by conventional alkylation procedures. The alkylating agent is a material which will introduce a tertiary-alkyl group into the benzene ring. Isobutene is ordinarily employed, but other agents such as tertiary-butyl alcohol or tertiary-butyl chloride may be used.

Catalysts or condensing agents useful in the alkylating step include hydrofluoric acid, sulfuric acid, Friedel-Crafts catalysts, such as zinc chloride, aluminum chloride, ferric chloride and boron fluoride, and complex compounds of the Friedel-Crafts catalysts with organic polar liquids such as nitrobenzene and nitromethane.

The alkylation step is conducted at temperatures in the range about minus 10 to 100° C. It is preferable to employ relatively mild alkylating conditions and, accordingly, the temperature of the alkylation step is preferably conducted at temperatures below about 70° C.

Following the alkylation step, the reaction product is distilled to separate the alkylated and unalkylated aromatic components of the charging stock. When more than one compound which will accept the tertiary-butyl group is present in the charging stock, the products will frequently have boiling-point differences greater than those of the unalkylated compounds. This permits isolation of the pure tertiary-butyl derivatives by distillation. These may in turn be dealkylated to give the original isomers in pure form.

Following the distillation, the tertiary-butyl group may be removed from the butylated components of the feed. This is accomplished by subjecting these materials to mild conventional dealkylation treatments or by equilibrating the materials with benzene or toluene in the presence of an alkylation catalyst under alkylating conditions. It has been found that the tertiary-butyl group may be selectively removed from butylated methylbenzenes by contacting the butylated methylbenzene with a dealkylation catalyst such as the metals of group VI and group VIII of the periodic table, alumina, or clay, at temperatures in the range about 250 to 500° C. Tertiary-alkyl groups, especially the tertiary-butyl group, are much more readily removed from the benzene ring than other alkyl groups, especially the methyl group, and their removal may be accomplished with relatively little concurrent isomerization of the resultant alkylbenzenes.

The tertiary-alkyl groups may also be removed from the alkylated components of the feed by contacting a mixture of the alkylated materials and benzene or toluene or other suitable acceptors with an alkylation catalyst under alkylating conditions. Under these conditions the tertiary-butyl group is transferred from its position on the ring of the polyalkylated benzene to the acceptor molecules. When benzene or toluene is used, the resultant reaction mixture comprises polyalkylbenzenes of the type contained in the original feed and tertiary-butylbenzene or tertiary-butyltoluene. Separation of these materials is readily effected by fractional distillation.

The manner in which the tertiary-butyl group is transferred from tertiary-butylated polyalkylbenzene molecules to toluene is shown in the data summarized in the following Table II. In this experiment hydrofluoric acid was used as the catalyst and the reaction mixture was agitated for a period of six hours at a temperature which range from 0 to 3° C.

TABLE II

*Dealkylation or transfer of the tertiary-butyl group from one hydrocarbon to another*

| Reactants and products | Charge, mols | Product composition | | | |
|---|---|---|---|---|---|
| | | Mols | Isomer distribution (wt. percent) | | |
| | | | Ortho | Meta | Para |
| Hydrofluoric acid (anhy.) | 8.0 | | | | |
| Toluene | 5.0 | 4.15 | | | |
| 1,2-dimethyl-4-tertiary-butyl-benzene | 1.0 | 0.15 | | | |
| Tertiary-butyltoluenes | | 0.85 | 0 | 52 | 48 |
| Xylenes | | 0.85 | [1] 100 [2] 97.7 | 0 | 0 |

[1] Spectrometric analysis.
[2] Freezing-point analysis.

It will be noted that the tertiary-butyl group was transferred from the 1,2-dimethyl-4-tertiary-butylbenzene to toluene without any detectable isomerization of the orthoxylene produced.

In another experiment the tertiary-butyl group was removed from 1,3-dimethyl-5-tertiary-butylbenzene using a different catalyst and using benzene as the acceptor. In this experiment a catalyst complex prepared by dissolving 10.0 g. (0.075 mol) of aluminum chloride in 12.0 g. (0.20 mol) of nitromethane was added to 163 g. (2.09 mols) of benzene and 81 g. (0.50 mol) of 1,3-dimethyl-5-tertiary-butylbenzene (B. P. 206.2–206.8° C. at 760 mm. $n_D^{20}$ 1.4960). The clear, reddish-brown solution was allowed to stand at 20° to 25° C. for 20 hours. It was then shaken with 250 ml. of 3 N hydrochloric acid. The combined organic phase and 2–50 ml. ether extracts of the aqueous phase were shaken with 2–100 ml. portions of 10% sodium hydroxide solution (to remove nitromethane) once with 100 ml. of water, dried over anhydrous magnesium sulfate, and ether and benzene removed by distillation through a short column. The residue (107.3 g.) was distilled through a 75 cm. x 16 mm. column packed with 3/32 in. glass helices. The composition of this product estimated from the distillation curve is:

| | Percent by weight |
|---|---|
| A. Xylenes | 41 |
| B. Tertiary-butylbenzene | 46 |
| C. 1,3-dimethyl-5-tertiary-butylbenzene | 9 |
| D. 1,4-di-tertiary-butylbenzene | 4 |

Analysis of the xylene fraction boiling from 139 to 147° C. by infrared spectrometry shows that it is essentially pure metaxylene containing no paraxylene and about 1.3% orthoxylene. The main portion distilled at 139.0 to 139.1° C. at 760 mm., $n_D^{20}$ 1.4970.

As indicated above, the tertiary-butyl derivative of the acceptor, for example, tertiary-butyltoluene, may be equilibrated with charging stock to be separated, for example, with a xylene mixture to transfer the tertiary butyl group to ortho- and metaxylenes. This step is illustrated by the following example:

A mixture of 222 g. (1.5 mols) of tertiary-butyltoluene (B. P. 190–193° C., approximately 80% para- and 20% metaisomers by infrared spectrometric analysis), 159 g. (1.5 mols) of metaxylene (approximately 95%) and 149 g. (7.45 mols) of liquid hydrogen fluoride was stirred vigorously for six hours in a copper flask immersed in an ice bath. The stirrer was stopped and the two-phase mixture allowed to warm to room temperature overnight, cooled again, poured on crushed-ice and the acid neutralized with excess potassium hydroxide. The organic phase and 2–200 ml. ether extracts of the aqueous phase were combined, washed with 200 ml. of 5% sodium bicarbonate solution, dried over anhydrous magnesium sulfate and the ether removed through a short column. The crude reaction product (321 g.) was distilled through a 75 cm. x 16 mm. column packed with 3/32 in. Pyrex glass helices. The composition of the hydrocarbon portion of the reaction mixture, estimated from the distillation curve, is:

| | Percent by weight |
|---|---|
| A. Toluene | 12 |
| B. Metaxylene | 29 |
| C. Tertiary-butyltoluenes | 34 |
| D. 1,3-dimethyl-5-tertiary-butylbenzene | 18.5 |
| E. Higher-boiling products (largely 3,5-di-tertiary-butyltoluene) | 6.5 |

I claim:

1. The method of separating a mixture of polyalkylbenzene hydrocarbons comprising polyalkylbenzenes characterized by the presence of at least three adjacent unsubstituted positions on the benzene nucleus and polyalkylbenzenes characterized by the presence of fewer than three adjacent unsubstituted positions on the benzene nucleus, which comprises contacting said mixture with a tertiary alkylating agent in the presence of an alkylation catalyst at a temperature in the range from —10° C. to 100° C., said alkylating agent being employed in a quantity such that the mole ratio of said alkylating agent to said polyalkylbenzenes characterized by the presence of at least three adjacent unsubstituted positions in the benzene nucleus is at least one, whereby the polyalkylbenzenes characterized by the presence of at least three adjacent unsubstituted positions on the benzene nucleus are selectively alkylated and separating from the reaction product mixture the unalkylated polyalkylbenzene constituents of said hydrocarbon mixture.

2. The method of separating hydrocarbon mixtures containing lower polyalkylbenzene hydrocarbons characterized by the presence of at least three adjacent unsubstituted positions on the benzene nucleus and lower polyalkylbenzenes characterized by the presence of fewer than three adjacent unsubstituted positions on the benzene nucleus, which comprises selectively alkylating the polyalkyl benzene having at least three adjacent unsubstituted positions in the nucleus by contacting said mixture with an alkylating agent selected from the group consisting of isobutene, di-isobutylene, tertiary-butylalcohol, tertiary-butylmercaptan, and tertiary-butylchloride in the presence of an alkylation catalyst at a temperature below about 70° C., said alkylating agent being employed in a quantity such that the mole ratio of said alkylating agent to said polyalkylbenzenes characterized by the presence of at least three adjacent unsubstituted positions in the benzene nucleus is at least one, and fractionally distilling the reaction product to separate the unalkylated constituents from the alkylated constituents of said mixture of lower polyalkylbenzenes.

3. The method of separating paraxylene from a hydrocarbon mixture comprising paraxylene and at least one other xylene isomer, which comprises selectively alkylating said other xylene isomer by contacting said mixture with a tertiary alkylating agent in the presence of an alkylation catalyst at a temperature in the range from —10° C. to 100° C., said alkylating agent being employed in a quantity such that the mole ratio of said alkylating agent to xylene isomers other than paraxylene is at least one, and fractionally distilling the reaction product to separate an overhead fraction comprising paraxylene.

4. The method of separating paraxylene from a hydrocarbon mixture comprising paraxylene and at least one other xylene isomer, which comprises selectively alkylating said other xylene isomer by contacting said mixture with a tertiary alkylating agent selected from the group consisting of isobutene, di-isobutylene, tertiary-butylalcohol, tertiary-butylmercaptan, and tertiary-butylchloride in the presence of an alkylation catalyst at a tempearture in the range from —10° C. to 100° C., said alkylating agent being employed in a quantity such that the mole ratio of said alkylating agent to xylene isomers other than paraxylene is at least one, and fractionally distilling the reaction product to separate an overhead fraction comprising paraxylene.

5. The method of separating hemimellitene from a mixture of hemimellitene and at least one isomeric trimethyl benzene which comprises selectively alkylating the hemimellitene by contacting said mixture with a tertiary alkylating agent in the presence of an alkylation catalyst at a temperature in the range from —10° C. to 100° C., said alkylating agent being employed in a quantity such that the mole ratio of said alkylating agent to said hemimellitene is at least one, and fractionally distilling the reaction product to separate an overhead fraction comprising said isomeric trimethyl benzene.

6. The method of separating hemimellitene from a hydrocarbon mixture comprising hemimellitene and at least one isomeric trimethyl benzene which comprises selectively alkylating the hemimellitene by contacting said mixture with a tertiary alkylating agent selected from the group consisting of isobutene, di-isobutylene, tertiary-butylalcohol, tertiary-butylchloride, and tertiary-butylmercaptan in the presence of an alkylation catalyst at a temperature in the range from —10° C. to 100° C., said alkylating agent being employed in a quantity such that the mole ratio of said alkylating agent to said hemimellitene is at least one, and fractionally distilling the reaction product to separate an overhead fraction comprising said isomeric trimethylbenzene.

7. The method of separating a hydrocarbon mixture comprising a para-alkyl toluene and at least one isomeric alkyl toluene which comprises selectively alkylating said isomeric alkyl toluene by contacting said mixture with a tertiary alkylating agent in the presence of an alkylation catalyst at a temperature in the range from —10° C. to 100° C., said alkylating agent being employed in a quantity such that the mole ratio of said alkylating agent to isomeric alkyl toluene is at least one, and fractionally distilling the reaction product to separate an overhead fraction comprising said para-alkyl toluene.

8. The method of separating individual xylene isomers from a xylene-rich distillation fraction derived from catalytically reformed naphtha, said fraction consisting predominantly of xylene isomers and containing ethylbenzene and paraffinic hydrocarbons boiling in the boiling range of the xylenes, which comprises selectively alkylating ethylbenzene and the xylene isomers other than para-xylene by contacting said fraction with a tertiary alkylating agent in the presence of an alkylation catalyst at a temperature in the range from —10° C. to 100° C., said alkylating agent being employed in a quantity such that the mole ratio of said alkylating agent to the total mols of said ethylbenzene and said xylene isomers other than paraxylene is at least one, and fractionally distilling the reaction product to separate a first fraction comprising paraxylene and paraffinic hydrocarbons, a second fraction comprising alkylated orthoxylene, and a third fraction comprising alkylated metaxylene.

9. The method of separating individual xylene isomers from a xylene-rich distillation fraction derived from catalytically reformed naphtha, said fraction consisting predominantly of xylene isomers and containing ethylbenzene and paraffinic hydrocarbons boiling in the boiling range of the xylenes, which comprises selectively alkylating ethylbenzene and the xylene isomers other than paraxylene by contacting said fraction with isobutene in the presence of an alkylation catalyst at a temperature in the range from —10° C. to 100° C., said alkylating agent being employed in a quantity such that the mole ratio of said alkylating agent to the total mols of said ethylbenzene and said xylene isomers other than para-xylene is at least one, and fractionally distilling the reaction product to separate a first fraction comprising paraxylene and paraffinic hydrocarbons, a second fraction comprising 1,3-dimethyl-5-tertiary-butylbenzene, and a third fraction comprising 1,2-dimethyl-4-tertiary-butylbenzene.

10. A process for separating hydrocarbon mixtures comprising polyalkylbenzene hydrocarbons having at least three adjacent unsubstituted positions on the benzene ring and polyalkylbenzenes having fewer than three adjacent unsubstituted positions on the benzene ring which comprises contacting the mixture with a tertiary alkylating agent in the presence of an alkylation catalyst at a temperature in the range from —10° C. to 100° C., said alkylating agent being employed in a quantity such that the mole ratio of said alkylating agent to said polyalkylbenzenes having at least three unsubstituted positions in the benzene ring is at least one, whereby the polyalkylbenzenes having at least three adjacent unsubstituted positions on the benzene ring are selectively alkylated and separating from the alkylation reaction product an unreacted fraction comprising polyalkylbenzenes having fewer than three adjacent unsubstituted positions on the benzene ring.

11. A process for separating hydrocarbon mixtures comprising polyalkylbenzene hydrocarbons having at least three adjacent unsubstituted positions on the benzene ring and polyalkylbenzenes having fewer than three adjacent unsubstituted positions on the benzene ring which comprises contacting the mixture with a tertiary alkylating agent in the presence of an alkylation catalyst at a temperature in the range from −10° C. to 100° C., said alkylating agent being employed in a quantity such that the mole ratio of said alkylating agent to said polyalkylbenzenes having at least three unsubstituted positions in the benzene ring is at least one, whereby the polyalkylbenzenes having at least three adjacent unsubstituted positions on the benzene ring are selectively alkylated, separating from the alkylation reaction product a fraction comprising unreacted polyalkylbenzenes having fewer than three adjacent unsubstituted positions on the benzene ring and a fraction comprising the alkylation reaction product formed by condensation of the polyalkylbenzenes having at least three adjacent unsubstituted positions on the benzene ring with the tertiary alkylating agent, contacting the latter fraction with an acceptor for the tertiary alkyl group in the presence of an alkylation catalyst at a temperature in the range from −10° C. to 100° C. and recovering polyalkylbenzenes having at least three adjacent unsubstituted positions on the benzene ring from the reaction product.

12. A process for separating hydrocarbon mixtures comprising paraxylene and at least one other xylene isomer which comprises contacting the mixture with a tertiary alkylating agent selected from the group consisting of isobutene, di-isobutylene, tertiary-butylalcohol, tertiary-butylchloride, and tertiary-butylmercaptan in the presence of an alkylation catalyst at a temperature in the range from −10° C. to 100° C., said alkylating agent being employed in a quantity such that the mole ratio of said alkylating agent to said xylene isomers other than para-xylene is at least one, whereby said other xylene isomer is selectively alkylated, separating from the alkylation reaction product a fraction comprising paraxylene and a fraction comprising a tertiary-butylxylene, contacting the latter fraction with a material selected from the group consisting of benzene, toluene, and phenol in the presence of an alkylation catalyst at a temperature in the range from −10° C. to 100° C. whereby transfer of the tertiary butyl group from a substantial proportion of the tertiary-butylxylene to said material is effected and recovering the tertiary butylated material and xylene from the reaction product.

13. Process of separating a 1,4-dialkyl benzene from an admixture thereof with at least 1 isomer including its monoalkyl isomer which comprises subjecting said admixture in liquid phase to alkylating conditions in contact with an alkylation catalyst and a quantity of an alkylating agent having at least one tertiary carbon atom per molecule so that the mole ratio of said alkylating agent to said isomers is at least one, whereby said isomers are selectively alkylated with said alkylating agent; and separating said 1,4-dialkyl benzene from the reaction mixture.

14. Process of separating para-xylene from an admixture thereof with at least one isomeric xylene and ethyl benzene which comprises subjecting said admixture to alkylating conditions in contact with an alkylation catalyst and a quantity of an alkylating agent having at least one tertiary carbon atom per molecule so that the mole ratio of said alkylating agent to total moles of xylenes and ethyl benzene is at least one, whereby the ethyl benzene and xylenes other than para-xylene are selectively alkylated with said alkylating agent, and separating para-xylene from the reaction mixture.

15. The method of separating para-xylene from a hydrocarbon mixture comprising para-xylene and at least one other xylene isomer, which comprises contacting said mixture with isobutene in the presence of an alkylation catalyst at a temperature in the range of from −10° to +10° C., said isobutene being employed in a quantity such that the mole ratio of said alkylating agent to xylene isomers other than para-xylene is about one, and fractionally distilling the reaction product to obtain an overhead fraction comprising para-xylene.

References Cited in the file of this patent

UNITED STATES PATENTS

| | | |
|---|---|---|
| 2,435,087 | Luten et al. | Jan. 27, 1948 |
| 2,534,072 | Schulze | Dec. 12, 1950 |
| 2,541,882 | Moore | Feb. 13, 1951 |

OTHER REFERENCES

Thomas: "Anhydrous Aluminum Chloride in Organic Chemistry," Reinhold Publishing Co. (1941), page 621.

Nightingale et al.: J. Amer. Chem. Soc., vol. 64, pages 1662–5 (1942).